(12) United States Patent
Kikinis

(10) Patent No.: US 8,769,566 B2
(45) Date of Patent: Jul. 1, 2014

(54) METHOD AND SYSTEM FOR ADVERTISING BASED ON THE CONTENT OF SELECTED CHANNELS OR BROADCASTED PROGRAMS

(75) Inventor: Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 1386 days.

(21) Appl. No.: 10/085,886

(22) Filed: Feb. 27, 2002

(65) Prior Publication Data

US 2002/0124254 A1    Sep. 5, 2002

Related U.S. Application Data

(60) Provisional application No. 60/273,102, filed on Mar. 2, 2001.

(51) Int. Cl.
*H04N 7/10* (2006.01)
*H04N 7/025* (2006.01)

(52) U.S. Cl.
USPC .................................. 725/34; 725/32; 725/35

(58) Field of Classification Search
USPC ........... 725/46, 32, 34, 35, 36, 131, 134, 139, 725/142
See application file for complete search history.

(56) References Cited

U.S. PATENT DOCUMENTS

| | | | |
|---|---|---|---|
| 5,526,034 A | 6/1996 | Hoarty et al. | |
| 5,550,578 A | 8/1996 | Hoarty et al. | |
| 5,801,747 A * | 9/1998 | Bedard | 725/46 |
| 6,034,678 A | 3/2000 | Hoarty et al. | |
| 6,100,883 A | 8/2000 | Hoarty | |
| 6,128,009 A * | 10/2000 | Ohkura et al. | 725/46 |
| 6,205,582 B1 | 3/2001 | Hoarty | |
| 6,438,752 B1 * | 8/2002 | McClard | 725/46 |
| 2002/0095676 A1 * | 7/2002 | Knee et al. | 725/46 |
| 2002/0104087 A1 * | 8/2002 | Schaffer et al. | 725/46 |
| 2003/0020744 A1 * | 1/2003 | Ellis et al. | 345/723 |
| 2003/0028871 A1 * | 2/2003 | Wang et al. | 725/9 |
| 2003/0067554 A1 * | 4/2003 | Klarfeld et al. | 348/461 |

* cited by examiner

*Primary Examiner* — John Schnurr
(74) *Attorney, Agent, or Firm* — Banner & Witcoff, Ltd.

(57) ABSTRACT

An advertisement is selected based on a demographic profile that is determined based on a second set of categories of broadcasted programs. The second set is a set to which a category from a first set of categories of broadcasted programs has been added in response to either a selecting of the category from the first set, or a broadcasted program viewing device being tuned, for a period of time at least equal to a first predetermined threshold, to at least one broadcasted program predetermined to be in the category from the first set. The advertisement may be displayed with an interactive programming guide.

24 Claims, 7 Drawing Sheets

METHOD AND SYSTEM FOR ADVERTISING BASED ON THE CONTENT OF SELECTED CHANNELS OR BROADCASTED PROGRAMS

RELATED APPLICATIONS

The present application hereby incorporates by reference the provisional filed application entitled Dynamically Adapted and Targeted Advertising in IPG Environments, filed on Mar. 2, 2001, Ser. No. 60/273,102. The present application is related to the application titled METHOD AND SYSTEM FOR CONTENT-BASED BROADCASTED PROGRAM SELECTION, filed on Nov. 30, 2001, Ser. No. 10/008,229.

FIELD OF THE INVENTION

The invention relates to the field of television. More specifically, the invention relates to televised advertising based on the content of channels or broadcasted programs viewed.

BACKGROUND OF THE INVENTION

Interactive programming guides ("IPGs") display information about broadcasted programs on a device such a television set. This information may include the titles of programs which are currently being broadcasted on various channels to which the viewer may tune his television set, as well the titles of programs which will be broadcast on these channels at some future time along with the times during which these programs will be broadcasted. The format in which this information is displayed may vary. The information may be displayed as a list, for example, or contain an audiovisual preview of a selected program's content.

A given broadcasted program, such as a television show, may be associated with a certain viewer demographic. Knowledge of this demographic aids advertisers in selecting the programs with which their advertisements may be presented to obtain a maximum return on advertising investment. For example, if it is known that an older demographic typically watches news programs, then advertisements for products typically used by older people may be selected by advertisers to be presented with news programs. Similarly, advertisements for toys may be presented with cartoon programs usually viewed by children. However, such advertisements target a general population and not individual viewers.

SUMMARY OF THE INVENTION

An advertisement is selected based on a demographic profile that is determined based on a second set of categories of broadcasted programs. The second set is a set to which a category from a first set of categories of broadcasted programs has been added in response to either a selecting of the category from the first set, or a broadcasted program viewing device being tuned, for a period of time at least equal to a first predetermined threshold, to at least one broadcasted program predetermined to be in the category from the first set. The advertisement may be displayed with an interactive programming guide.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

While the description below refers to categories of content of broadcasted programs, it is clear that the description applies equivalently to categories of content of channels where the general content of those channels is determinable (e.g., channels carrying broadcasted programs dealing largely with news, sports, entertainment, science, business, law, music, movies, etc.).

Figure 1A:
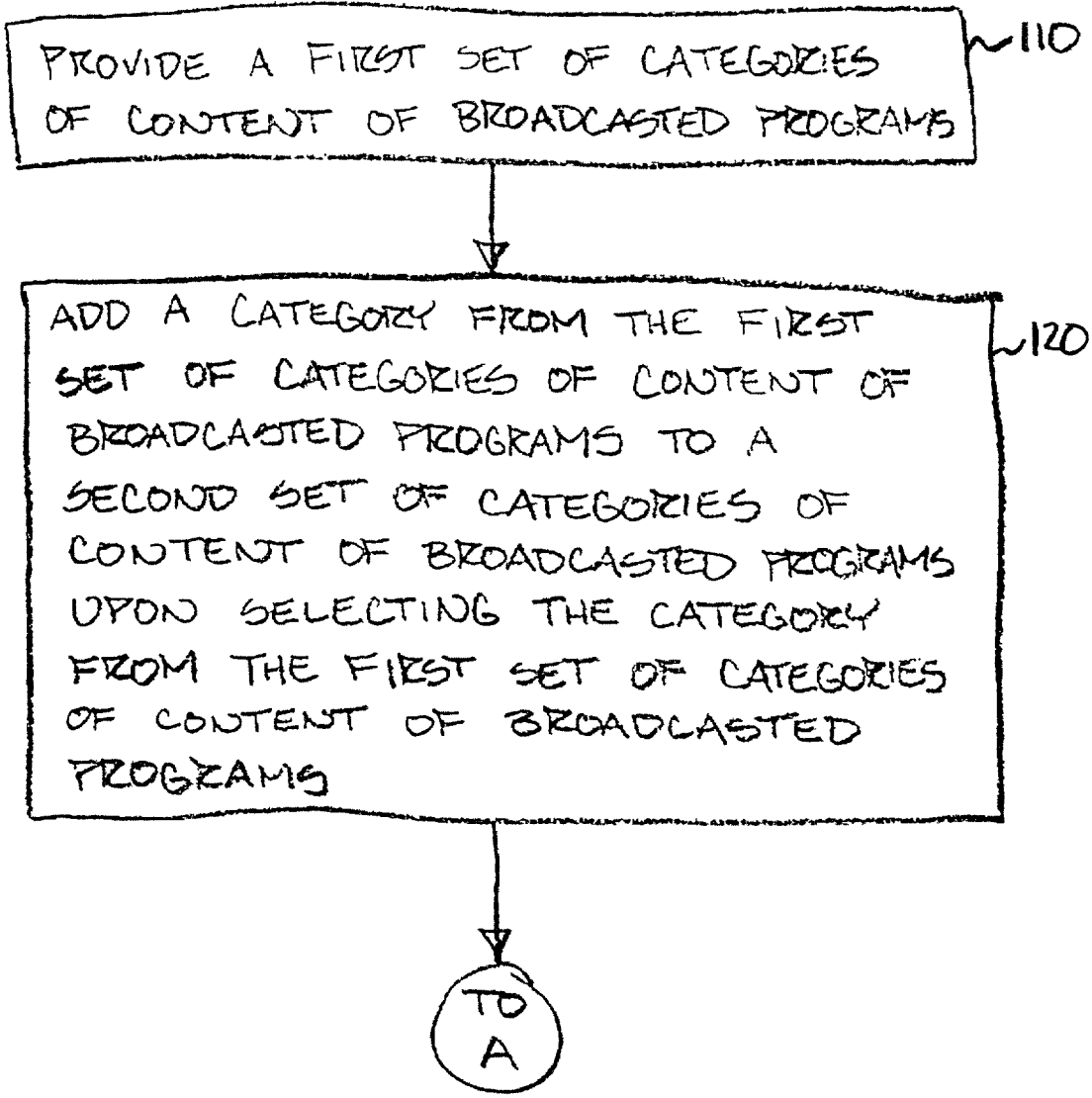
FIGS. 1A and 1B illustrate flow diagrams for adding a category to a set of categories of content of broadcasted programs, according to one embodiment.

FIG. 1A illustrates a flow diagram for adding a category to a set of categories of content of broadcasted programs, according to one embodiment. In process block 110, a first set of categories of content of broadcasted programs is provided. In one embodiment, the first set of categories of content of broadcasted programs is provided by a media provider. A media provider may be a cable television provider, a satellite television provider, or any other provider of broadcasted programs through a communication medium. The communication medium may be a cable, such as a fiber optic or copper cable, or the communication medium may be a form of unguided medium, such as electromagnetic waves traveling through the air. Whatever the communication medium used, in process block 120, a category from the first set of categories of content of broadcasted programs is added to a second set of categories of content of broadcasted programs upon a selecting of the category from the first set of categories of content of broadcasted programs. Selecting a category of content may be accomplished by using a television remote control to navigate a menu displayed on a television screen. Television and remote control shall be construed in the broadest sense, and include set-top boxes, Web pads, and other types of TV viewing system available now and in the future, whether analog or digital.

Figure 1B:
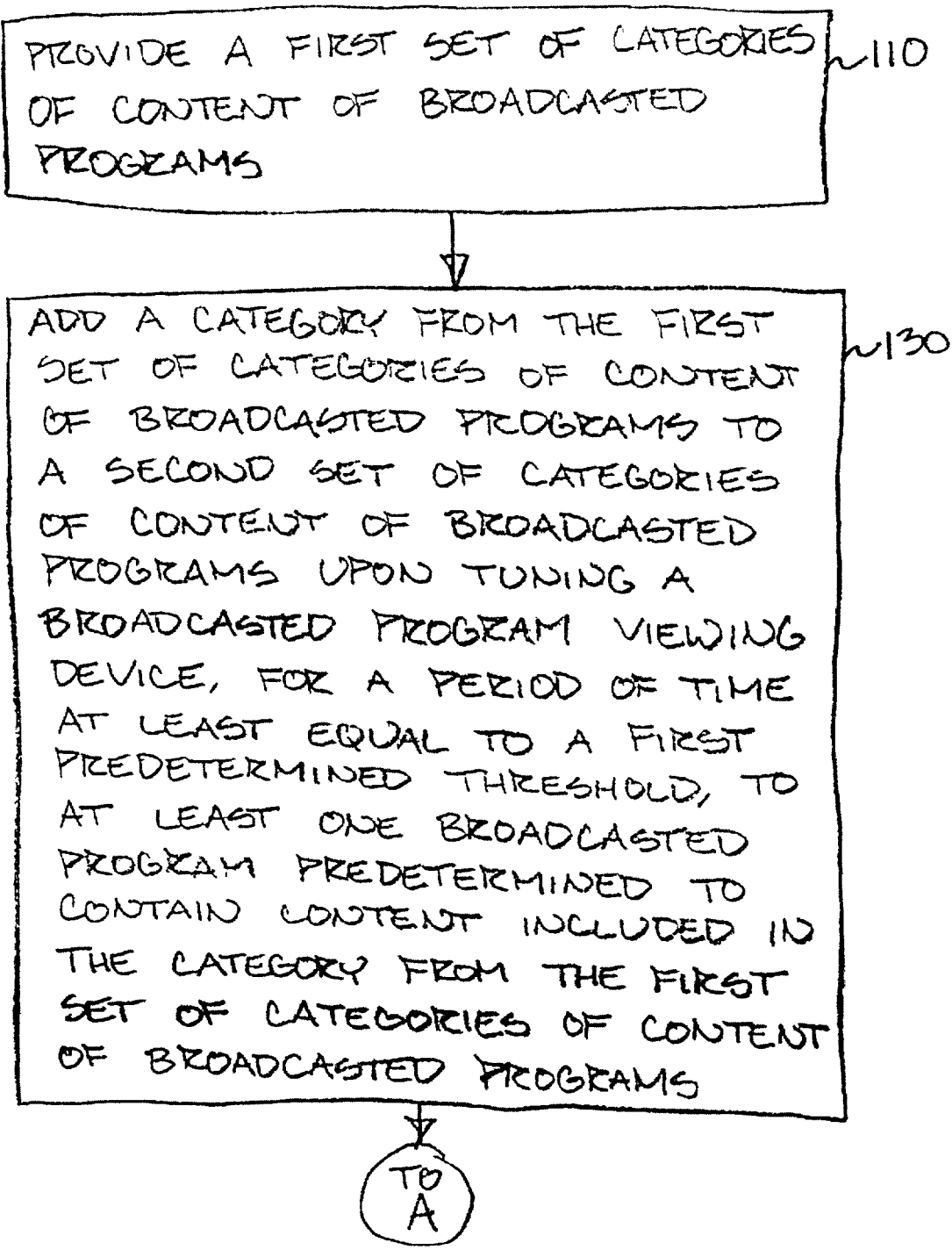

FIG. 1B illustrates a flow diagram for adding a category to a set of categories of content of broadcasted programs, according to one embodiment. Again, in process block 110, a first set of categories of content of broadcasted programs are provided. But in this embodiment, a category from the first set categories of content of broadcasted programs is added to a second set of categories of content of broadcasted programs upon a tuning of a broadcasted program viewing device, such as a television, for a period of time at least equal to a first predetermined threshold, to at least one broadcasted program predetermined to contain content included in the category from the first set categories of content of broadcasted programs. For example, if a television was tuned to any number of broadcasted programs containing content predetermined to be in the "sports" content category over a combined span of 45 minutes, and if the first predetermined threshold was equal to 30 minutes, then the "sports" category from the first set of categories of content of broadcasted programs would be added to the second set of categories of content of broadcasted programs. In one embodiment, a category may be added based on the number of times that broadcasted programs including content fitting into the category are selected, rather than the length of time that such broadcasted programs are viewed.

Figure 2A:
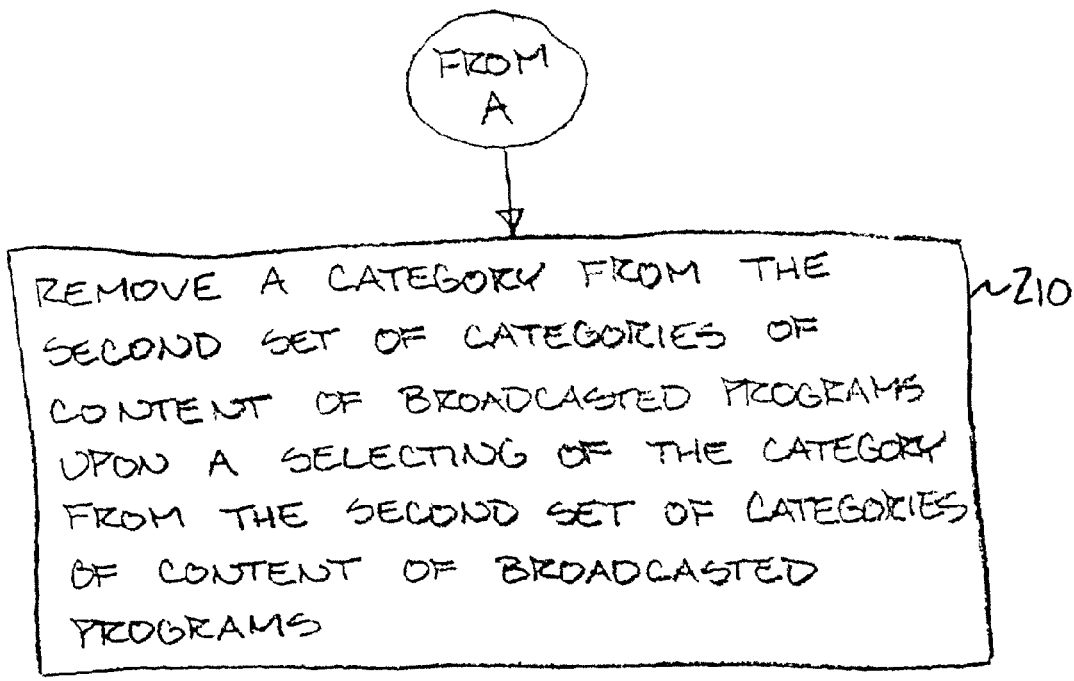
FIGS. 2A and 2B illustrate flow diagrams for removing a category from a set of categories of content of broadcasted programs, according to one embodiment.

FIG. 2A illustrates a flow diagram for removing a category from a set of categories of content of broadcasted programs, according to one embodiment. In process block 210, a category from the second set of categories of content of broadcasted programs is removed upon a selecting of the category from the second set of categories of content of broadcasted programs. The selection may be accomplished with a remote control and a menu displayed on a television screen as described above by the user himself.

Figure 2B:
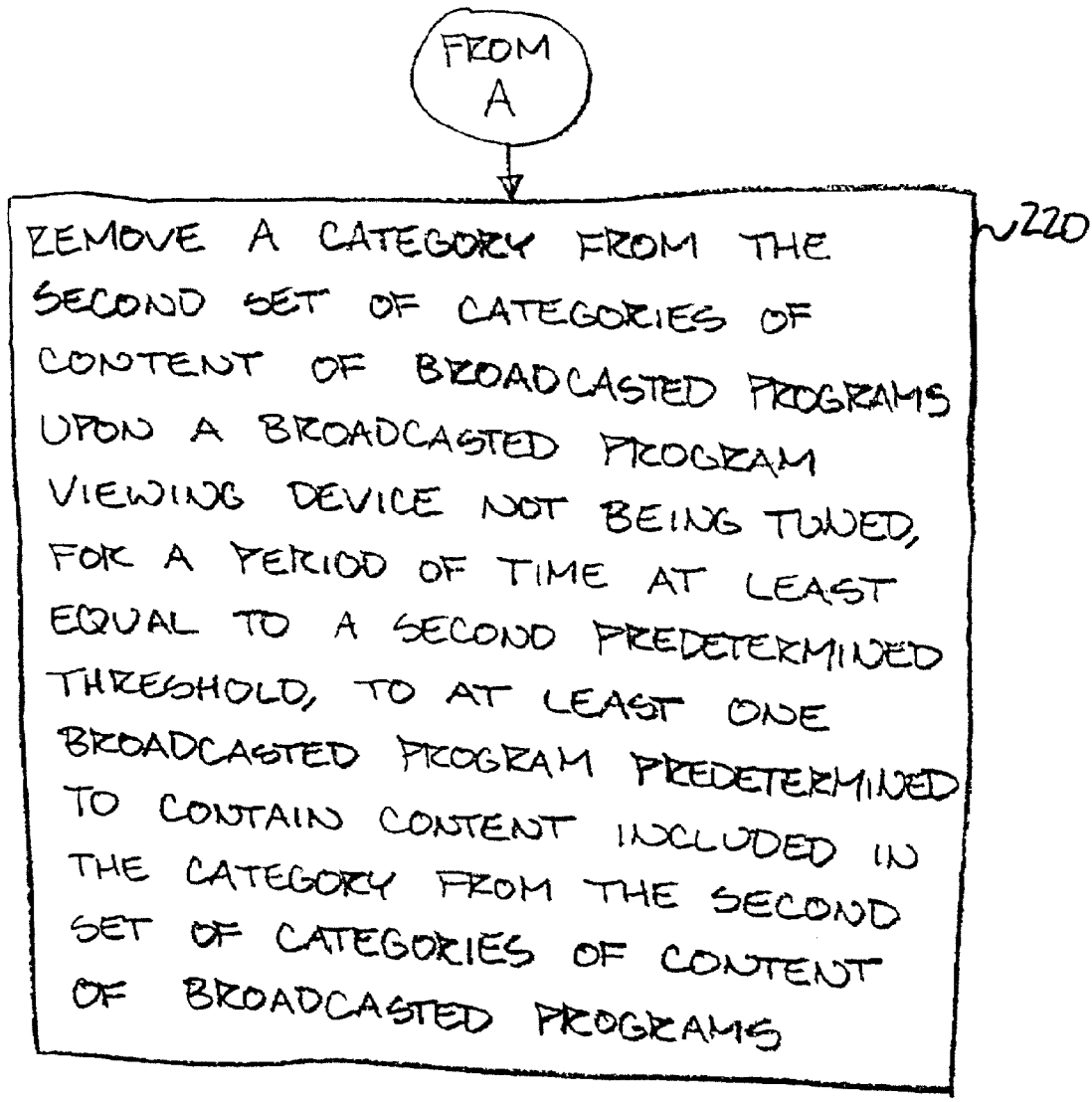

FIG. 2B illustrates a flow diagram for removing a category from a set of categories of content of broadcasted programs, according to one embodiment. In this embodiment, shown in process block 220, a category is removed from the second set of categories of content of broadcasted programs upon a broadcasted program viewing device not being tuned, for a period of time at least equal to a second predetermined threshold, to at least one broadcasted program predetermined to contain content included in the category from the second set of categories of content of broadcasted programs. For example, if the second set of categories of content of broadcasted programs includes the category of content "news", and the television is not tuned, over a week or some other predetermined period of time, to broadcasted programs fitting into the "news" content category for at least 30 minutes, and if the second predetermined threshold is 30 minutes, then the category "news" would be removed from the second set of categories of content of broadcasted programs.

Figure 3:
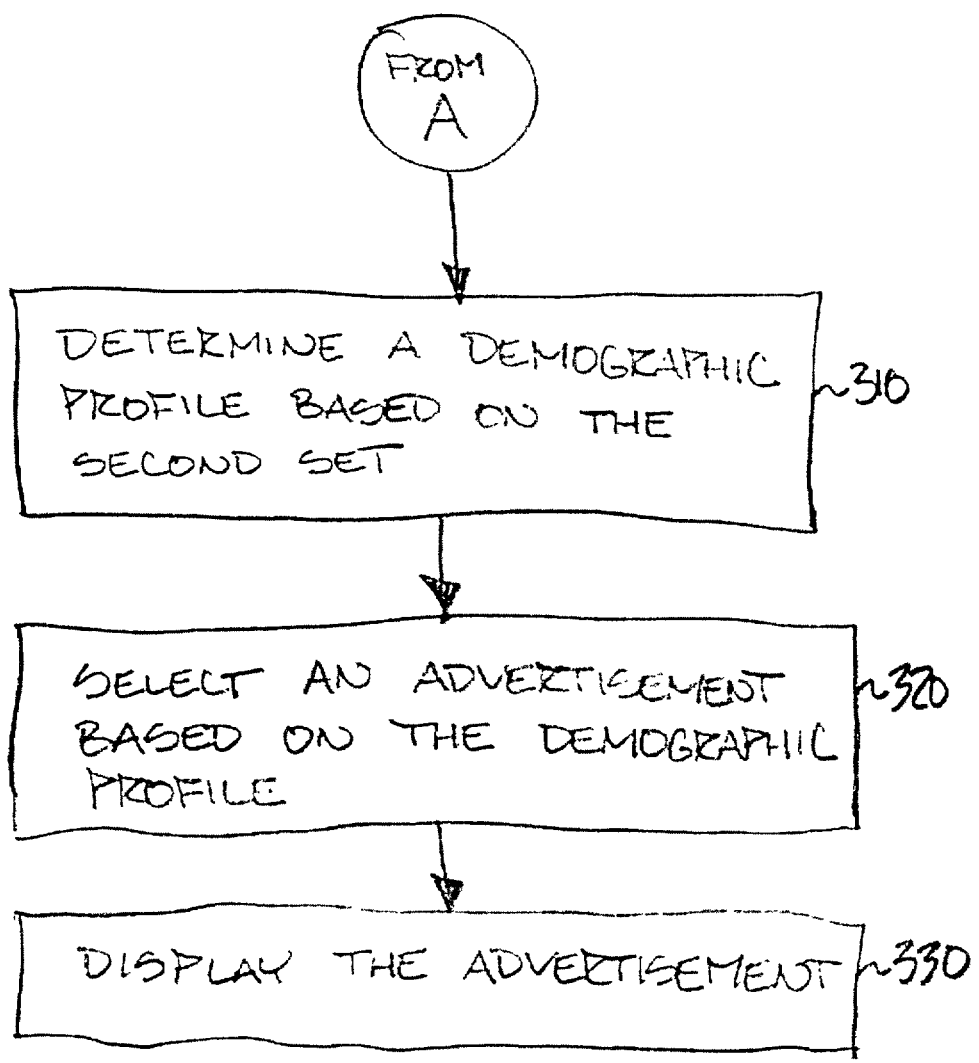
FIG. 3 illustrates a flow diagram for selecting an advertisement based on a set of categories of content of broadcasted programs, according to one embodiment.

FIG. 3 illustrates a flow diagram for selecting an advertisement based on a set of categories of content of broadcasted programs, according to one embodiment. In processing block 310, a demographic profile is determined based on the second set of categories of content of broadcasted programs. In one embodiment, the categories in the second set may be sorted according to various criteria. In one embodiment, a differentiation of the duration of viewing time for each of the categories in the second set is performed. The categories in the second set may be compared to a number of sets of categories corresponding to different demographic profiles to determine a demographic profile corresponding to a set of categories most closely matching the second set. The demographic profile is a description of various human properties (i.e., gender, age, etc.) typically shared by viewers of broadcasted programs in categories corresponding to the demographic profile. Such human properties may include approximate ranges (e.g., "ages 50 and older") or precise single values.

For example, a second set of categories including categories "soap opera" and "daytime talk show" might match a demographic profile for women who are homemakers or mothers of young children. A set of categories including categories "action" and "sports" might match a demographic profile for men aged 18-40. A set of categories including a category "late night" might match a demographic for insomniacs. Demographic profiles may include any combination of gender, age, race, income level, region, and/or other human properties. More than one demographic profile may match a set of categories. The duration of viewing time of each category may be used to weight each category, further increasing the accuracy of a resulting demographic profile determination. The demographic profile may be composed of the categories themselves. The demographic profiles and associated categories may be stored in a memory of a device such as a set-top box.

In some cases, a system may provide for multiple profiles for each user. In some cases, the system may try to determine a multitude of users by analyzing various aspects of the viewing profile, and hence assign each "behavior peak" to a separate virtual user.

In processing block 320, an advertisement is selected based on the demographic profile. The advertisement selected will be marketing a product or service predetermined to be of special interest to the demographic profile. For example, if the demographic profile is "insomniac," then an advertisement for specialty mattresses, sleeping medications, personal injury lawyers, etc., may be selected. If the demographic profile is "children under 12" (determined, for example, from a dominance of a "cartoon" category in the set) then an advertisement for breakfast cereal, action figures, traveling circus exhibitions, etc., may be selected.

In processing block 330, the advertisement is displayed. For example, an audiovisual advertisement may be displayed in a region of an IPG. The region may be an unused region of the IPG, a window of the IPG dedicated to the display of advertisements, etc. It is clear that the above examples and others described herein are provided by way of example and are not to be interpreted as limiting.

Figure 4:
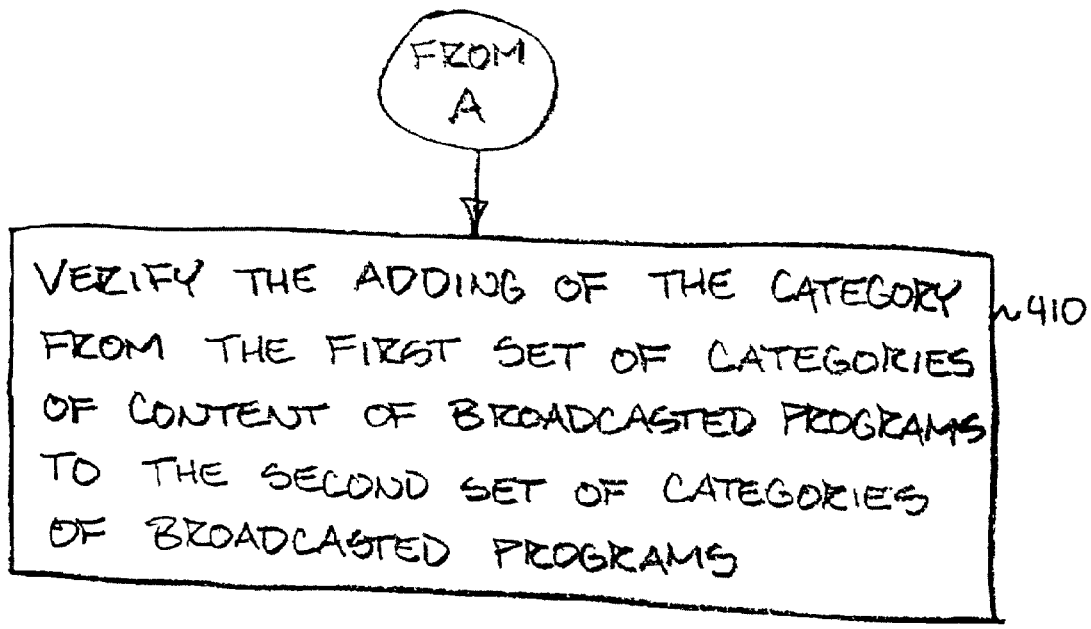
FIG. 4 illustrates a flow diagram for verifying the adding of a category to a set of categories of content of broadcasted programs, according to one embodiment.

FIG. 4 illustrates a flow diagram for verifying the adding of a category to a set of categories of content of broadcasted programs, according to one embodiment. In process block 410, the adding of the category from the first set of categories of content of broadcasted programs to the second set of categories of broadcasted programs is verified. In one embodiment, a viewer is prompted before a category is added to the second set of categories of broadcasted programs. In one embodiment, a viewer may either allow or disallow the addition of the category to the second set of categories of content of broadcasted programs. This prevents undesirable programs from inadvertently and mistakenly being added to the second set of categories of content of broadcasted programs.

Figure 5:
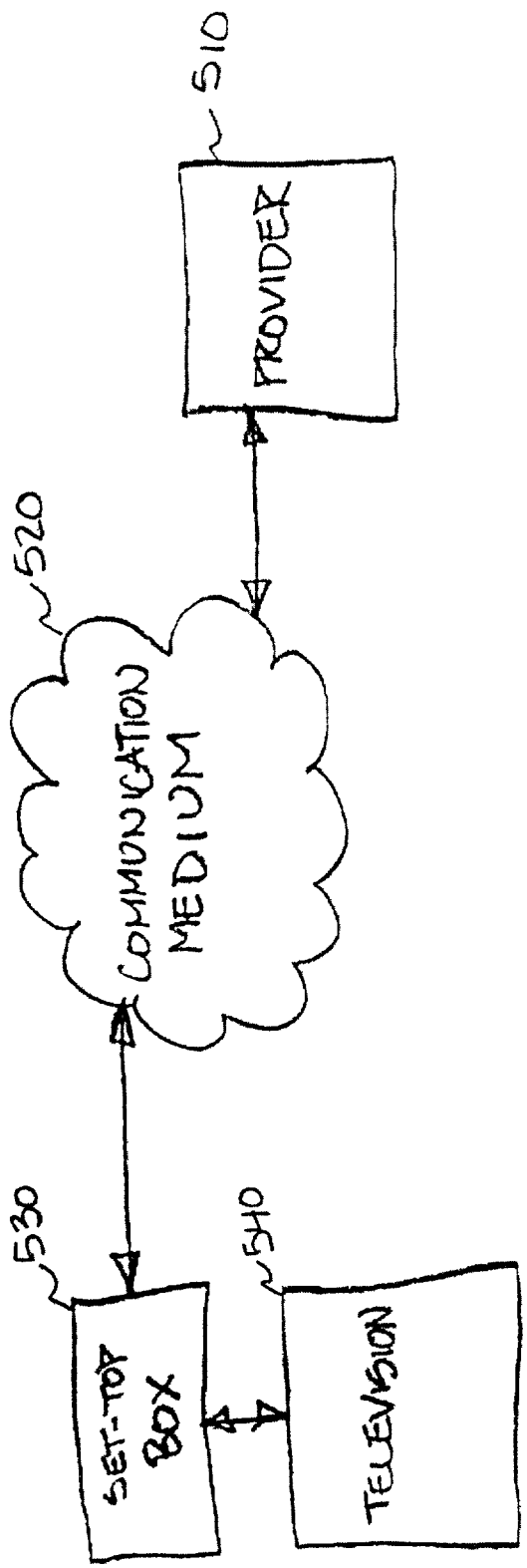
FIG. 5 illustrates a system for selecting an advertisement based on a set of categories of content of broadcasted programs, according to one embodiment.

FIG. 5 illustrates a system for selecting an advertisement based on a set of categories of content of broadcasted programs, according to one embodiment. A provider 510 is connected to or otherwise in communication with a communication medium 520. Provider 510 is a media provider, as described above with reference to FIG. 1A. In one embodiment, provider 510 is a computer. Provider 510 may be located at a head end of a broadcasting system. The head end of the broadcasting system is a point from which media is broadcasted through the communication medium to various receivers. Communication medium 520 may be a cable or some form of unguided medium. Communication medium 520 is connected to or otherwise is communication with a set-top box 530. Set-top box 530 may be integrated into a video cassette recorder/player ("VCR") or digital video disc ("DVD") player, or a so-called Personal Video Recorder ("PVR") based typically on non volatile storage, such as hard disks, flash memory, writeable DVDs etc., such as are commercially available by TivO™, ReplayTV™ etc. Set-top box 530 is connected to television 540.

In one embodiment, set-top box 530 is to select an advertisement. A set of advertisements with corresponding demographic profiles may be stored in software and/or circuitry in set-top box 530. The advertisement is based on a demographic profile. The demographic profile is based on a second set of categories of broadcasted programs to which a category from a first set of categories of broadcasted programs was added as described above with reference to FIGS. 1A and 1B. In one embodiment, set-top box 530 is to determine the demographic profile based on the second set. Software and/or circuitry to perform this determination may be stored in set-top box 530. In one embodiment, television 540 is to display the advertisement with an interactive programming guide, as described above with reference to FIG. 3.

In one embodiment, provider 510 is to determine the demographic profile based on the second set. The second set may be transmitted from set-top box 530 through communication medium 520 to provider 510.

In one embodiment, provider 510 is to transmit a set of advertisements to set-top box 530 through communication medium 520. Set-top box 530 receives the set of advertisements through communication medium 520.

In one embodiment, the functionality of set-top box 530 described above may be incorporated into television 540. Set-top box 530 may be absent from the system and television 540 may be connected to or otherwise in direct communication with communication medium 520.

In one embodiment, the second set of categories of content of broadcasted programs includes a fixed, immutable subset of categories.

The classification of a broadcasted program into a category of content may be based on an analysis of data available from an electronic programming guide. This analysis could be based upon the title of the broadcasted program, or on a description of the broadcasted program. In one embodiment, the first set of categories of content of broadcasted programs is determined by a media provider. In one embodiment, a different first set of categories of content of broadcasted programs may be generated especially for different types of viewers. For example, one set of categories could be generated for sports fans. Another set of categories could be generated for people who like to watch news.

The embodiments described above can be implemented using software in a TV viewing system. Such a TV viewing system can be implemented in many ways. A typical approach to implementation uses a set-top box that contains, among other things, a CPU, storage (e.g., RAM, ROM, etc.), a receiving network adapter, and circuitry to drive a viewing system such as a TV, monitor, projector, etc. All of these elements are not necessarily shown, but are well know in the art. For purposes of the embodiments described below, any other grouping, such as a TV with a built-in CPU, or a personal computer with TV capabilities are considered to be equivalent. Such television viewing system are typically supplied with TV content by system operators, including but not limited to cable provider/operators, satellite provider/operators, broadcasters, overbuilders, etc.

The method and apparatus disclosed herein may be integrated into advanced Internet- or network-based knowledge systems as related to information retrieval, information extraction, and question and answer systems. The system has a processor coupled to a bus. Also coupled to the bus are a memory which may contain instructions. Additional components coupled to the bus are a storage device (such as a hard drive, floppy drive, CD-ROM, DVD-ROM, etc.), an input device (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

Although the present invention has been described with reference to specific exemplary embodiments, it will be evident that various modifications and changes may be made to these embodiments without departing from the broader spirit and scope of the invention. One skilled in the art will appreciate that the embodiments described above apply also to satellite and internet and telephone systems as well as the cable systems described. Accordingly, the specification and drawings are to be regarded in an illustrative rather than a restrictive sense.

What is claimed is:

1. A method comprising:

determining, by a content receiving device, a type of user of a content rendering device, wherein the determined type of user is indicative of at least one genre of content typically accessed by a user of the content rendering device;

in response to determining the type of user of the content receiving device, generating, by the content receiving device, a first set of categories of content items based on the determined type of user, wherein the first set of categories of content items is generated especially for the user based on the determined type of user;

adding, by the content receiving device, a category from the first set of categories of content items to a second set of categories of content items in response to the content rendering device rendering, for a period of time at least equal to a first predetermined threshold, a plurality of content items belonging to the category of the first set of categories;

assigning, by the content receiving device, a category weight to each of a plurality of categories in the second set of categories to form a weighted second set of categories, wherein each said category weight is assigned based on a duration of time that the content rendering device is rendering content items in each corresponding category;

comparing, by the content receiving device, the weighted second set of categories to a plurality of sets of categories to determine a closest matching set of categories of the plurality of sets of categories, wherein each of the plurality of sets of categories is associated with a different demographic profile;

determining, by the content receiving device, a demographic profile corresponding to the weighted second set of categories, wherein the demographic profile corresponding to the weighted second set of categories is a demographic profile associated with the closest matching set of categories;

receiving, at the content receiving device, a set of advertisements;

storing, on the content receiving device, the set of advertisements; and selecting, by the content receiving device, a first advertisement from the set of advertisements based on the determined demographic profile corresponding to the weighted second set of categories.

2. The method of claim 1, further comprising:
displaying the first advertisement with an interactive programming guide.

3. The method of claim 1, further comprising:
transmitting the second set of categories to a unit at a head end of a broadcasting system providing the first set of categories of content items.

4. The method of claim 1, further comprising:
removing a category from the second set of categories in response to the content rendering device not rendering, for a period of time at least equal to a second predetermined threshold, at least one content item belonging to the category of the second set of categories.

5. The method of claim 1, further comprising:
verifying with the user the adding of the category from the first set to the second set.

6. The method of claim 1, further including adding a category from the first set to the second set in response to multiple selections of at least one content item belonging to the category of the first set of categories, said multiple selections at least equal to a predetermined number of selections.

7. The method of claim 1 further including adding a category from the first set to the second set of categories in response to a selecting of the category from the first set.

8. The method of claim 1, further comprising:
removing a category from the second set in response to a selection of the category from the second set.

9. The method of claim 1, wherein determining that the content rendering device has rendered, for the period of time at least equal to the first predetermined threshold, the plurality of content items belonging to the category of the first set of categories includes:
determining a first period of time the content rendering device is rendering a first content item belonging to the category of the first set of categories; and
determining a second period of time the content rendering device is rendering a second content item different from the first content item, the second content item also belonging to the category of the first set of categories,
wherein a sum of the first period of time and second period of time is at least equal to the first predetermined threshold.

10. The method of claim 1, wherein the demographic profile comprises the plurality of categories in the second set of categories.

11. The method of claim 1, wherein the content receiving device and the content rendering device are parts of a single device.

12. One or more non-transitory computer readable media storing computer executable instructions, that when executed, cause a machine to:
determine a type of user of a content rendering device, wherein the determined type of user is indicative of at least one genre of content typically accessed by a user of the content rendering device;
in response to determining the type of user of the content rendering device, generate a first set of categories of content items based on the determined type of user, wherein the first set of categories of content items is generated especially for the user based on the determined type of user;
add a category from the first set of categories of content items to a second set of categories of content items in response to the content rendering device rendering, for a period of time at least equal to a first predetermined threshold, a plurality of content items belonging to the category of the first set of categories;
assign a category weight to each of a plurality of categories in the second set of categories to form a weighted second set of categories, wherein each said category weight is assigned based on a duration of time that the content rendering device is rendering content items in each corresponding category;
compare the weighted second set of categories to a plurality of sets of categories to determine a closest matching set of categories of the plurality of sets of categories, wherein each of the plurality of sets of categories is associated with a different demographic profile;
determine a demographic profile corresponding to the weighted second set of categories, wherein the demographic profile corresponding to the weighted second set of categories is a demographic profile associated with the closest matching set of categories;
receive, at a content receiving device, a set of advertisements;
store, on the content receiving device, the set of advertisements; and
select a first advertisement from the set of advertisements based on the determined demographic profile corresponding to the weighted second set of categories.

13. The one or more non-transitory computer readable media of claim 12, wherein the computer executable instructions, when executed, further cause the machine to:
display the advertisement with an interactive programming guide.

14. The one or more non-transitory computer readable media of claim 12, wherein the computer executable instructions, when executed, further cause the machine to:
transmit the second set to a unit at a head end of a broadcasting system.

15. The one or more non-transitory computer readable media of claim 12, wherein the computer executable instructions, when executed, further cause the machine to:
remove a category from the second set of categories in response to the content rendering device not rendering, for a period of time at least equal to a second predetermined threshold, at least one content item belonging to the category of the second set.

16. The one or more non-transitory computer readable media of claim 12, wherein the computer executable instructions, when executed, further cause the machine to:
verify with the user the adding of the category from the first set to the second set.

17. The one or more non-transitory computer readable media of claim 12, wherein the computer executable instructions, when executed, further cause the machine to add a category from the first set to the second set in response to multiple selections of at least one content item belonging to the category of the first set of categories, said multiple selections at least equal to a predetermined number of selections.

18. The one or more non-transitory computer readable media of claim 12, wherein the computer executable instructions, when executed, further cause the machine to add a category from the first set to the second set of categories in response to a selecting of the category from the first set.

19. The one or more non-transitory computer readable media of claim 12, wherein the computer executable instructions, when executed, further cause the machine to:

remove a category from the second set of categories in response to a selection of the category from the second set.

20. The one or more non-transitory computer readable media of claim 12, wherein determining that the content rendering device has rendered, for the period of time at least equal to the first predetermined threshold, the plurality of content items belonging to the category of the first set of categories includes:
  determining a first period of time the content rendering device is rendering a first content item belonging to the category of the first set of categories; and
  determining a second period of time the content rendering device is rendering a second content item different from the first content item, the second content item also belonging to the category of the first set of categories;
  wherein a sum of the first period of time and second period of time is at least equal to the first predetermined threshold.

21. The one or more non-transitory computer readable media of claim 12, wherein the content receiving device and the content rendering device are parts of a same device.

22. A content receiving device comprising:
  a processor; and
  memory operatively coupled to the processor and storing computer readable instructions that, when executed, cause the content receiving device to:
    determine a type of user of a content rendering device, wherein the determined type of user is indicative of at least one genre of content typically accessed by a user of the content rendering device;
    in response to determining the type of user of the content receiving device, generate a first set of categories of content items based on the determined type of user, wherein the first set of categories of content items is generated especially for the user based on the determined type of user;
    add a category from the first set of categories of content items to a second set of categories of content items in response to the content rendering device rendering, for a period of time at least equal to a first predetermined threshold, a plurality of content items belonging to the category of the first set of categories;
    assign a category weight to each of a plurality of categories in the second set of categories to form a weighted second set of categories, wherein each said category weight is assigned based on a duration of time that the content rendering device is rendering content items in each corresponding category;
    compare the weighted second set of categories to a plurality of sets of categories to determine a closest matching set of categories of the plurality of sets of categories, wherein each of the plurality of sets of categories is associated with a different demographic profile;
    determine a demographic profile corresponding to the weighted second set of categories, wherein the demographic profile corresponding to the weighted second set of categories is a demographic profile associated with the closest matching set of categories;
    receive a set of advertisements;
    store the set of advertisements; and
    select a first advertisement from the set of advertisements based on the determined demographic profile corresponding to the weighted second set of categories.

23. The content receiving device of claim 22, wherein the demographic profile comprises the plurality of categories in the second set of categories.

24. The content receiving device of claim 22 further comprising the content rendering device.

* * * * *